(12) United States Patent
Iwamura et al.

(10) Patent No.: US 9,067,422 B2
(45) Date of Patent: Jun. 30, 2015

(54) INK CARTRIDGE, METHOD FOR MANUFACTURING INK CARTRIDGE, INK-JET RECORDING APPARATUS, AND INK-JET RECORDING METHOD

(71) Applicants: Yuko Iwamura, Chiryu (JP); Ryuji Kato, Kiyosu (JP)

(72) Inventors: Yuko Iwamura, Chiryu (JP); Ryuji Kato, Kiyosu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 216 days.

(21) Appl. No.: 13/762,449

(22) Filed: Feb. 8, 2013

(65) Prior Publication Data
US 2013/0201262 A1   Aug. 8, 2013

(30) Foreign Application Priority Data
Feb. 8, 2012   (JP) ................... 2012-024779

(51) Int. Cl.
*B41J 2/175*   (2006.01)
*C09D 11/328*  (2014.01)
*C09D 11/38*   (2014.01)

(52) U.S. Cl.
CPC .......... *B41J 2/17503* (2013.01); *B41J 2/17559* (2013.01); *Y10T 29/49401* (2015.01); *C09D 11/328* (2013.01); *C09D 11/38* (2013.01)

(58) Field of Classification Search
CPC .... B41J 2/175; B41J 2/17503; B41J 2/17513; B41J 2/1753; B41J 2/17559; B41J 2/2107; C09D 11/30; C09D 11/32; C09D 11/328; C09D 11/38
USPC ........................ 347/20, 86, 100, 85
See application file for complete search history.

(56) References Cited

U.S. PATENT DOCUMENTS

| 6,918,662 | B2 * | 7/2005 | Arita et al. ............... 347/100 |
| 8,016,404 | B2 | 9/2011 | Kato et al. |
| 2004/0099181 | A1 * | 5/2004 | Tateishi et al. ........... 106/31.47 |
| 2004/0183874 | A1 * | 9/2004 | Toyoda et al. ............ 347/86 |
| 2005/0275701 | A1 * | 12/2005 | Aoi et al. ................ 347/100 |
| 2008/0241398 | A1 | 10/2008 | Kato et al. |
| 2010/0092767 | A1 * | 4/2010 | Naito et al. .............. 428/336 |
| 2012/0081453 | A1 | 4/2012 | Tsuzaka et al. |

* cited by examiner

FOREIGN PATENT DOCUMENTS

| JP | 2002-327132 A | 11/2002 |
| JP | 2008-246821 A | 10/2008 |

*Primary Examiner* — Matthew Luu
*Assistant Examiner* — Rut Patel
(74) *Attorney, Agent, or Firm* — Banner & Witcoff, Ltd.

(57) ABSTRACT

An ink cartridge including:
a water-based ink for ink-jet recording which contains a dye represented by a general formula (1), a triazole-based compound, and water; and
a metallic component which has a contact surface contacting with the water-based ink, a concentration of a iron-oxidized component at the contact surface being not more than 5 atomic %

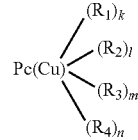

wherein, in the general formula (1),
Pc (Cu) represents a copper phthalocyanine nucleus represented by a general formula (Pc).

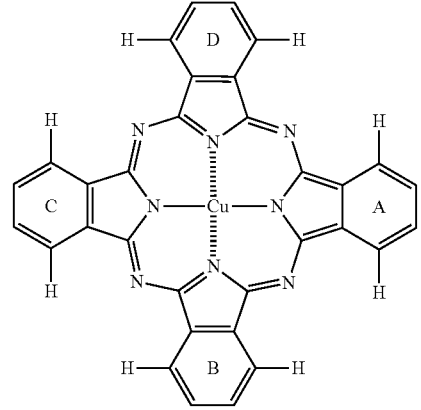

12 Claims, 3 Drawing Sheets

INK CARTRIDGE, METHOD FOR MANUFACTURING INK CARTRIDGE, INK-JET RECORDING APPARATUS, AND INK-JET RECORDING METHOD

CROSS REFERENCE TO RELATED APPLICATION

The present application claims priority from Japanese Patent Application No. 2012-024779, filed on Feb. 8, 2012, the disclosure of which is incorporated herein by reference in its entirety.

BACKGROUND OF THE INVENTION

1. Field of the Invention

The present invention relates to an ink cartridge, a method for manufacturing an ink cartridge, an ink-jet recording apparatus, and an ink-jet recording method.

2. Description of the Related Art

There has conventionally been known a water-based ink for ink-jet recording containing a copper phthalocyanine-based dye with higher or enhanced ozone resistance and a triazole-based compound (Japanese Patent Application Laid-open No. 2002-327132). The water-based ink has enhanced ozone resistance and excellent rust-preventing property by containing the triazole-based compound.

However, the water-based ink has such a problem that a precipitation (a deposit) is generated by making the water-based ink come contact with a metallic component or metallic member used for the ink cartridge. The precipitation may cause discharge failure by clogging a filter, which is disposed at an intermediate position of a channel of the water-based ink in an ink-jet recording apparatus to prevent a foreign substance etc. from arriving in the vicinity of nozzles.

In view of the above, an object of the present teaching is to provide an ink cartridge which is capable of suppressing generation of a precipitation even when a water-based ink for ink-jet recording containing a copper phthalocyanine-based dye with higher or enhanced ozone resistance and a triazole-based compound is accommodated therein.

SUMMARY OF THE INVENTION

According to a first aspect of the present teaching, there is provided an ink cartridge including: a water-based ink for ink-jet recording which contains a dye represented by a general formula (1), a triazole-based compound, and water; and a metallic component which has a contact surface contacting with the water-based ink, a concentration of a iron-oxidized component at the contact surface being not more than 5 atomic %

(1)

wherein, in the general formula (1),

Pc (Cu) represents a copper phthalocyanine nucleus represented by a general formula (Pc);

$R_1$, $R_2$, $R_3$, and $R_4$ each represent a substituent selected from the group consisting of —$SO_2R_a$, —$SO_2NR_bR_c$, and —$CO_2R_a$; $R_1$, $R_2$, $R_3$, and $R_4$ are not all identical to each other; at least one of $R_1$, $R_2$, $R_3$, and $R_4$ has an ionic hydrophilic group as a substituent; at least one of $R_1$, $R_2$, $R_3$, and $R_4$ is present on each of four benzene rings A, B, C, and D of the copper phthalocyanine nucleus represented by the general formula (Pc); $R_a$ represents a substituted or unsubstituted alkyl group; $R_b$ represents a hydrogen atom or a substituted or unsubstituted alkyl group; $R_c$ represents a substituted or unsubstituted alkyl group;

k satisfies 0<k<8; l satisfies 0<l<8; m satisfies 0≤m<8: n satisfies 0≤n<8; and k, l, m, and n satisfy 4≤k+l+m+n≤8.

According to a second aspect of the present teaching, there is provided a method for manufacturing an ink cartridge including: preparing a metallic component which has a contact surface, a concentration of a iron-oxidized component at the contact surface being not more than 5 atomic %; incorporating the metallic component into the ink cartridge; preparing a water-based ink containing a dye represented by a general formula (1), a triazole-based compound, and water; and accommodating the water-based ink into the ink cartridge so that the water-based ink contacts with the contact surface of the metallic component in the ink cartridge.

According to a third aspect of the present teaching, there is provided an ink-jet recording apparatus which performs recording on a recording medium, the apparatus including: an ink cartridge accommodating section which accommodates the ink cartridge of the first aspect; and an ink discharging mechanism which discharges, onto the recording medium, the water-based ink of the ink cartridge.

According to a fourth aspect of the present teaching, there is provided an ink-jet recording method for performing recording on a recording medium, the method including: preparing the ink cartridge of the first aspect; and discharging, onto the recording medium, the water-based ink of the ink cartridge.

DESCRIPTION OF THE PREFERRED EMBODIMENTS

In order to achieve the object described above, the inventors found out, through a series of diligent research and study, that by making a concentration of an iron-oxidized component at a surface (a contact surface), of a metallic component used for an ink cartridge, which comes into contact with a water-based ink be not more than 5 atomic %, generation of a precipitation is suppressed even when a water-based ink for ink-jet recording containing a copper phthalocyanine-based dye with higher or enhanced ozone resistance represented by the general formula (1) and a triazole-based compound is accommodated in the ink cartridge. Then, the inventors arrived at the present teaching. Instead of making the concentration of the iron-oxidized component at the contact surface, of the metallic component, which comes into contact with the water-based ink be not more than 5 atomic %, the contact surface of the metallic component which comes into contact with the water-based ink may be coated with a material which does not contain the iron-oxidized component.

[Ink Cartridge]

The ink cartridge of the present teaching is an ink cartridge accommodating a water-based ink for ink-jet recording (hereinafter referred to simply as "water-based ink" or "ink"). The water-based ink contains a dye represented by the general formula (1), water, and a triazole-based compound. The ink cartridge includes the metallic component which has the surface contacting with the water-based ink in which the concentration of the iron-oxidized component is not more than 5 atomic %. The ink cartridge of the present teaching may include a plurality of metallic components contacting with the water-based ink. The concentration of the iron-oxidized component at the surface, of the metallic component, which comes into contact with the water-based ink is measured by an X-ray photoelectron spectroscopy method (XPS).

Structures, profiles, and the like of the ink cartridge of the present teaching are not particularly limited, at least provided that the ink cartridge accommodates the water-based ink containing the dye represented by the general formula (1), water, and the triazole-based compound, that the ink cartridge includes the metallic component, and that the concentration of the iron-oxidized component at the surface, of the metallic component, which comes into contact with the water-based ink is not more than 5 atomic %. As a, body of the ink cartridge of the present teaching, for example, it is allowable to use publicly known products.

Figure 1:
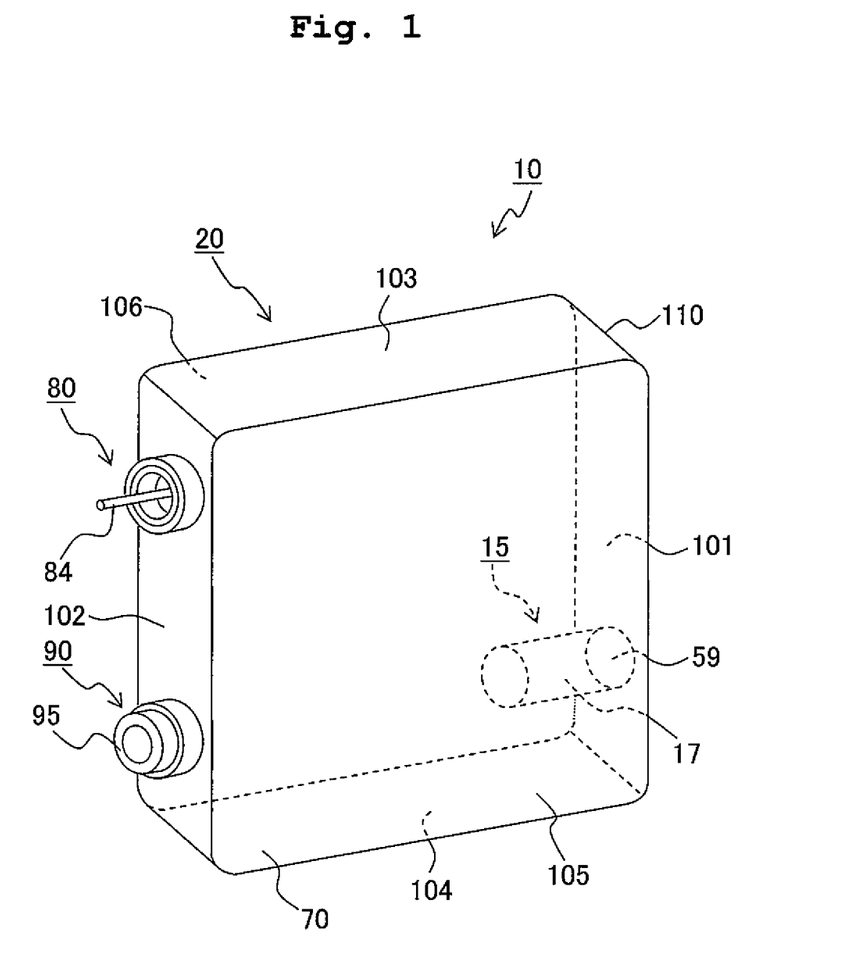
FIG. 1 is a schematic perspective view showing an example of an external structure of an ink cartridge of the present teaching.
Figure 2:
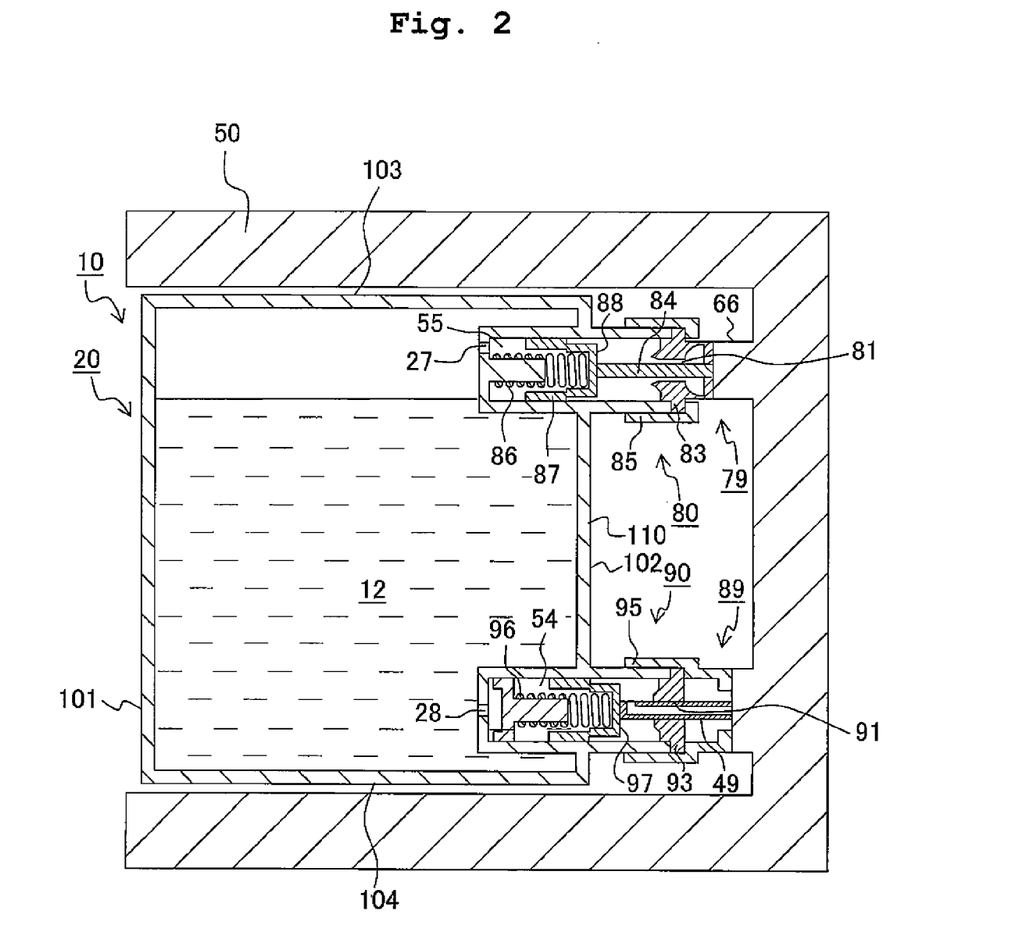
FIG. 2 is a schematic cross-sectional view showing a state that the ink cartridge shown in FIG. 1 is installed to a cartridge installing section of an ink-jet recording apparatus.

It is shown an example of a construction of the ink cartridge of the present teaching in FIGS. 1 and 2. FIG. 1 is a schematic perspective view showing an example of an external structure of the ink cartridge of the present teaching. FIG. 2 is a schematic cross-sectional view showing a state that the ink cartridge shown in FIG. 1 is installed to a cartridge installing section of an ink-jet recording apparatus. In an ink cartridge 10 of the present teaching, a compression coil spring 96 shown in FIG. 2 is the metallic component referred to herein.

As shown in FIGS. 1 and 2, the ink cartridge 10 is a substantial hexahedron having a generally flat shape and includes a body 20, an atmosphere communication valve 80, and an ink supply valve 90 as main constitutive members. Each of the members is formed of a resin material. The resin material is exemplified by nylon, polyethylene, polypropylene, etc. The ink cartridge 10 may further include a casing which covers substantially the whole of the body 20, a protector which covers an atmosphere communication portion 79 and an ink drawing portion 89 (see FIG. 2) as will be described later on, and the like.

The body 20 includes a frame 110 and a film 70. The frame 110 is formed of a resin material having translucency; and is obtained, for example, by injection molding the resin material. The frame 110 may be formed of any resin provided that the resin has the translucency. For example, the frame 110 can be made of a transparent or semi-transparent resin. The frame 110 is formed in an annular shape substantially along a front surface 101, an upper surface 103, a back surface 102, and a bottom surface 104. Thus, openings are formed in a left surface 105 and a right surface 106 of the frame 110. Further, the frame 110 includes an ink inlet portion 15, the atmosphere communication portion 79, and the ink drawing portion 89 as main constitutive members.

Thin films 70 each formed of the transparent resin are attached to the left surface 105 and the right surface 106 of the frame 110, respectively. In particular, the films 70 are welded on outer edge portions of the left surface 105 and the right surface 106 of the frame 110 by the ultrasonic welding. The openings of the left surface 105 and the right surface 106 of the frame 110 are closed by the films 70. Accordingly, as shown in FIG. 2, a space surrounded by the frame 110 and the films 70 is partitioned as an ink chamber 12. A water-based ink as will be described later is accommodated in the ink chamber 12 partitioned as descried above. In the present teaching, the ink chamber 12 is formed of the frame 110 and the films 70. The ink chamber 12, however, may be formed as follows. That is, for example, the frame 110 itself is formed to be a container having a rectangular parallelepiped form and the ink chamber 12 is formed therein.

The ink inlet portion 15 is provided to inject the water-based ink into the ink chamber 12. The ink inlet portion 15 is provided in the front surface 101 of the frame 110. In particular, the ink inlet portion 15 is disposed on a slightly lower side of the vicinity of the middle of the front surface 101 of the frame 110. The ink inlet portion 15 includes a cylindrical portion 17. The cylindrical portion 17 is a hole having a substantial cylindrical shape which is drilled through the front surface 101 toward the ink chamber 12; and the cylindrical portion 17 has a cylindrical-shaped inner space therein. An end portion of the cylindrical portion 17 is closed by an outer peripheral wall. The opening of the cylindrical portion 17 on the side of the front surface 101 is an ink inlet port 59 opened to the outside of the body 20. The water-based ink as will be described later on is injected into the cylindrical portion 17 from the ink inlet port 59.

A circular opening is provided at an upper portion of the back surface 102 of the frame 110; and a valve accommodating chamber 55 having a cylindrical shape is formed at an inner side of the frame 110 while communicating with the circular opening. The valve accommodating chamber 55 is installed to be extended in a depth direction of the body 20. The end portion of the valve accommodating chamber 55 is communicated with the ink chamber 12 through a through hole 27. The atmosphere communication valve 80 is accommodated in the valve accommodating chamber 55. Accordingly, the atmosphere communication portion 79 is formed at the upper portion of the back surface 102 of the frame 110. The atmosphere communication portion 79 allows the ink chamber 12 to communicate with the outside through an atmosphere communication hole 81 as will be described later on.

The atmosphere communication valve 80 is formed as a valve mechanism which opens or closes a route extending from the opening at the upper portion of the back surface 102 to an air layer in the ink chamber 12. The atmosphere communication valve 80 includes a valve body 87, a compression coil spring 86, a seal member 83, and a cap 85 as main constitutive members. In the valve accommodating chamber 55, the valve body 87 is slidably provided in the depth direction of the body 20. The valve body 87 includes a lid body 88 and a rod 84. The rod 84 is inserted through the atmosphere communication hole 81. The rod 84 is formed to have a diameter smaller than that of the atmosphere communication hole 81. Therefore, the rod 84 is capable of moving, together with the valve body 87, without meeting with sliding resistance from the seal member 83. Since the rod 84 has the diameter smaller than that of the atmosphere communication hole 81, a gap through which the air is allowed to flow is formed between the rod 84 and the atmosphere communication hole 81. The rod 84 protrudes outward from a central axis of the lid body 88 through the center of the opening at the upper portion of the back surface 102.

The cap 85 is attached to an outer edge portion of the opening at the upper portion of the back surface 102 via the seal member 83. The through hole (not shown) is provided in the cap 85 and the seal member 83. In a case that the cap 85 and the seal member 83 are attached to the outer edge portion of the opening at the upper portion of the back surface 102, the atmosphere communication hole 81, which allows the interior of the valve accommodating chamber 55 to communicate with the exterior of the valve accommodating chamber 55, is formed by the through hole.

A circular opening is provided at a lower portion of the back surface 102 of the frame 110; and a valve accommodating chamber 54 having a cylindrical shape is formed at an inner side of the frame 110 while communicating with the circular opening. The valve accommodating chamber 54 is installed to be extended in the depth direction of the body 20. The end portion of the valve accommodating chamber 54 is communicated with the ink chamber 12 through a through hole 28. The ink supply valve 90 is accommodated in the valve accommodating chamber 54. Accordingly, the ink drawing portion 89 is formed at the lower portion of the back surface 102 of the frame 110. The ink drawing portion 89 draws the water-based ink from the ink chamber 12 to the outside through an ink supply hole 91 as will be described later on.

The ink supply valve 90 is formed as a valve mechanism which opens or closes a route extending from the opening at the lower portion of the back surface 102 to the ink chamber 12. The ink supply valve 90 includes a valve body 97, a compression coil spring 96, a seal member 93, and a cap 95 as main constitutive members. The compression coil spring 96 is the same as the compression coil spring 86. As will be described later on, the compression coil spring 86 does not contact with the water-based ink, while the compression coil spring 96 contacts with the water-based ink. Thus, in the ink cartridge of the present teaching, the compression coil spring 96 is the metallic component.

The cap 95 is attached to an outer edge portion of the opening at the lower portion of the back surface 102 via the seal member 93. The through hole (not shown) is provided in the cap 95 and the seal member 93. In a case that the cap 95 and the seal member 93 are attached to the outer edge portion of the opening at the lower portion of the back surface 102, the ink supply hole 91, which allows the interior of the valve accommodating chamber 54 to communicate with the exterior of the valve accommodating chamber 54, is formed by the through hole. The ink supply hole 91 is a portion through which an ink needle 49 is inserted in a case that the ink cartridge 10 is installed on a cartridge installing section (an ink cartridge accommodating section) 50 of the ink-jet apparatus as will be described later on.

The ink cartridge 10 is installed on the cartridge installing section 50 of the ink-jet recording apparatus from the side of the back surface 102 in an upright posture as shown in FIG. 1 (see FIG. 2).

In this situation, the valve body 87 slides in the valve accommodating chamber 55, and accompanying with the sliding operation, the lid body 88 slides between a position, at which the lid body 88 makes contact with the seal member 83 (second position) and a position, at which the lid body 88 is away from the seal member 83 (first position). In a case that the lid body 88 makes contact with the seal member 83, the atmosphere communication hole 81 is closed. That is, a route, which extends from the valve accommodating chamber 55 through the gap to arrive at the outside, is closed in a state that the lid body 88 is arranged at the second position. In a case that the lid body 8 is away from the seal member 83, the atmosphere communication hole 81 is opened. That is, the route, which extends from the valve accommodating chamber 55 through the gap to arrive at the outside, is opened in a state that the lid body 88 is arranged at the first position.

In the valve accommodating chamber 55, the compression coil spring 86 elastically biases or urges the valve body 87 in a direction in which the atmosphere communication hole 81, which is the route extending from the opening at the upper portion of the back surface 102 to the ink chamber 12, is closed (right direction in FIG. 2). That is, the compression coil spring 86 presses the valve body 87 in a direction in which the lid body 88 is moved closer to the seal member 83. Therefore, the atmosphere communication hole 81 is usually closed by the lid body 88 of the atmosphere communication valve 80.

In the valve accommodating chamber 54, the compression coil spring 96 elastically biases or urges the valve body 97 in a direction in which the ink supply hole 91 forming an ink route is closed. That is, the compression coil spring 96 elastically biases or urges the valve body 97 in a direction in which the valve body 97 is moved closer to the seal member 93 (right side in FIG. 2). Therefore, the ink supply hole 91 is usually closed by the valve body 97 of the ink supply valve 90.

A pressing portion 66 is provided at the upper end portion of the cartridge installing section 50 of the ink-jet recording apparatus. The pressing portion 66 is provided at a position corresponding to the rod 84 of the atmosphere communication valve 80. The pressing portion 66 is a member receiving the tip or forward end portion of the rod 84. The tip of the rod 84 makes contact with the pressing portion 66 during a process in which the ink cartridge 10 is inserted into the cartridge installing section 50 of the ink-jet recording apparatus. In a case that the ink cartridge 10 is inserted further into the cartridge installing section 50 of the ink-jet recording apparatus in this state, the rod 84 is pushed into the atmosphere communication valve 80 against the urging force of the compression coil spring 86; and the rod 84 and the lid body 88 are moved to a deep side of the valve accommodating chamber 55. Accordingly, the atmosphere communication hole 81 is opened. By flowing air in/from the ink chamber 12 via the atmosphere communication hole 81, the air layer in the ink chamber 12 has the same pressure as the pressure of the atmosphere.

The ink needle 49 is provided at the lower end portion of the cartridge installing section 50 of the ink-jet recording apparatus. The ink needle 49 is provided at a position corresponding to the ink supply valve 90 of the ink cartridge 10. The ink needle 49 is a hollow tube which projects frontward from the inner end of the ink cartridge installing section 50 of the ink-jet recording apparatus. The ink needle 49 is inserted through the ink supply hole 91 of the ink supply valve 90 to make contact with the valve body 97 during a process in which the ink cartridge 10 is inserted into the cartridge installing section 50 of the ink-jet recording apparatus. As described above, the ink needle 49 is provided to be capable of pressing the valve body 97 to a position corresponding to the valve body 97. The outer diameter dimension of the ink needle 49 is set to be slightly larger than that of the ink supply hole 91 so that the outer peripheral surface of the ink needle 49 is brought in tight contact with the seal member 93 in a case that the ink needle 49 is inserted through the ink supply hole 91. Thus, in a case that the ink needle 49 is inserted through the ink supply hole 91, the seal member 93 is brought in contact under pressure with the ink needle 49. As described above, the tip of the ink needle 49 makes contact with the valve body 97 during a process in which the ink cartridge 10 is inserted into the cartridge installing section 50 of the ink-jet recording apparatus. In a case that the ink cartridge 10 is inserted further into the cartridge installing section 50 of the ink-jet recording apparatus in this state, the valve body 97 is pushed against the urging force of the compression coil spring 96 to be moved to a deep side of the valve accommodating chamber 54. Accordingly, the ink supply hole 91 is opened. By inserting the ink needle 49 into the valve accommodating chamber 54 as described above, the water-based ink in the ink chamber 12 can be drawn through the valve accommodating chamber 54 and the ink needle 49. In this situation, although the water-based ink makes contact with the compression coil spring 96, since the concentration of the iron-oxidized component at the contact surface, of the compression coil spring 96, which comes into contact with the water-based ink, is made to be not more than 5 atomic %, generation of a precipitation is suppressed. Accordingly, in the present teaching, the metallic component is used to ensure rigidity so that a desired function is realized at a predetermined position in the ink cartridge, and further it is possible to suppress the generation of the precipitation.

In the ink cartridge 10 of the present teaching, the compression coil spring 96 is the metallic component. The present teaching, however, is not limited thereto. The metallic component of the ink cartridge of the present teaching may be a component other than the compression coil spring, in addition to or instead of the compression coil spring.

In the present teaching, "the iron-oxidized component (the oxidized component of the iron)" means, for example, iron oxide such as FeO, $Fe_3O_4$, $\alpha$-$Fe_2O_3$, $\beta$-$Fe_2O_3$, $\gamma$-$Fe_2O_3$, and $\epsilon$-$Fe_2O_3$; iron oxyhydroxide such as $\alpha$-FeOOH, $\beta$-FeOOH, $\gamma$-FeOOH, and $\delta$-FeOOH; and ferric hydroxide such as $Fe(OH)_2$ and $Fe(OH)_3$.

As described above, the concentration of the iron-oxidized component at the surface, of the metallic component, which comes into contact with the water-based ink is not more than 5 atomic %. By making the concentration of the iron-oxidized component be not more than 5 atomic %, the generation of the precipitation is suppressed even when the water-based ink for ink-jet recording containing the copper phthalocyanine-based dye with higher or enhanced ozone resistance represented by the general formula (1) and the triazole-based compound is accommodated in the ink cartridge. The copper phthalocyanine-based dye represented by the general formula (1) has copper at the center of a phthalocyanine backbone or skeleton; and has a specific substituent to enhance the ozone resistance. On the other hand, $Cu^{2+}$ and a benzotriazole-based compound each have a property to be bonded to each other. The water-based ink for ink-jet recording is designed not to cause the precipitation in a normal state, because copper is trapped by the phthalocyanine backbone or skeleton and $Cu^{2+}$ and the benzotriazole-based compound are not bonded to each other. However, in a case that the iron-oxidized component exists, as an impurity, in a Cr oxide film of the surface of the metallic component (for example, SUS304 as will be later on), the iron-oxidized component of the impurity functions as a catalyst for bonding $Cu^{2+}$ and the benzotriazole-based compound to produce a copper-benzotriazole complex. Here, the copper retaining force or copper trapping force of the copper phthalocyanine-based dye represented by the general formula (1) is assumed to be low as compared with the copper retaining force of another copper phthalocyanine-based dye having a different substituent. Therefore, the precipitation caused by the copper-benzotriazole complex is generated in the water-based ink for ink-jet recording. Compared to this, in the ink cartridge of the present teaching, the generation of the precipitation is suppressed by making the concentration of the iron-oxidized component be not more than 5 atomic %. However, mechanisms for the generation and the suppressing of the precipitation are mere assumptions, and the present teaching is not limited to the assumptions. It is more preferable, as the concentration of the iron-oxidized component is lower. The concentration of the iron-oxidized component is preferably not more than 2 atomic %. However, in the present teaching, the concentration of the iron-oxidized component may be greater than 0 atomic %.

The concentration of the iron-oxidized component is a value measured by an X-ray Photoelectron Spectroscopy (XPS), which is also known as an Electron Spectroscopy for Chemical Analysis (ESCA). In particular, X-rays are irradiated by a scanning-type X-ray photoelectron spectrometer onto the surface, of the metallic component, which comes into contact with the water-based ink; an electron which escapes due to a photoelectric effect is measured by an electron energy analyzer; and the concentration of the iron-oxidized component at the surface contacting with the water-based ink is found. The concentration of the iron-oxidized component may be measured under an appropriate measurement condition by using an appropriate measurement apparatus. For example, the measurement may be performed by a measurement condition and a measurement apparatus in examples as will be described later on. In XPS spectra, in a case that the iron (Fe) and oxygen (O) are bonded to each other, the bonded iron (Fe) and oxygen (O) have peak positions which are different from those of the iron (Fe) alone and the oxygen (O) alone. Thus, by using XPS, it is possible to evaluate a bonding state of the iron-oxidized component (component bonded to the iron and the oxygen) etc.

A method for adjusting the concentration of the iron-oxidized component is not especially limited. The concentration of the iron-oxidized component may be made to be not more than 5 atomic %, for example, by performing a treatment such as an acid treatment, an alkali treatment, and a chelate treatment to the metallic component. The acid treatment is a treatment in which the metallic component is immersed in acid such as nitric acid, sulfuric acid, hydrochloric acid, and hydrofluoric acid. The alkali treatment is a treatment in which the metallic component is immersed in alkali such as inorganic alkalis including sodium hydroxide, potassium hydroxide, etc., and organic amino acid including triethylene glycol etc. The chelate treatment is a treatment in which the metallic component is immersed in a chelate agent such as citric acid, ethylenediamine tetraacetate (EDTA), and sodium salt of EDTA. By performing any of the treatments, the concentration of the iron-oxidized component at the surface, of the metallic component, which comes into contact with the water-based ink can be, for example, approximately 1 atomic % to 2 atomic %. From a viewpoint of a cost for performing the treatment, the concentration of the iron-oxidized component is preferably not less than 1 atomic %.

Therefore, the concentration of the iron-oxidized component is preferably in the range of 1 atomic % to 5 atomic %, and is more preferably in the range of 1 atomic % to 2 atomic %.

Alternatively, instead of performing the acid treatment etc., the surface, of the metallic component, on a side contacting with the water-based ink may be coated with a material which does not contain the iron-oxidized component. As the coating material, it is possible to use, for example, resin, chromium plating, and nickel plating.

A material for forming the metallic component is not especially limited, and is exemplified by stainless steel such as SUS 304, SUS314, SUS403, and SUS316. Out of these, SUS304 is particularly preferable.

An area of the surface (the contact surface), of the metallic component, which comes into contact with the water-based ink is preferably not more than 150 mm$^2$ per gram of the water-based ink (150 mm$^2$/1 g). By making the area of the surface contacting with the water-based ink per gram of the water-based ink be not more than 150 mm$^2$/1 g, it is possible to restrain the generation of the precipitation effectively. It is more preferable, as the area of the surface contacting with the water-based ink per gram of the water-based ink is smaller. The area of the surface contacting with the water-based ink per gram of the water-based ink is preferably not more than 115 mm$^2$/1 g, and is more preferably 76 mm$^2$/1 g. Here, "the area of the surface (the contact surface) contacting with the water-based ink per gram of the water-based ink" is a value obtained by dividing the area of the surface contacting with the water-based ink (mm$^2$) by the total weight (g) of the water-based ink accommodated in the ink cartridge.

As described above, the water-based ink containing the dye represented by the general formula (1), water, and the triazole-based compound is accommodated in the ink cartridge.

In the general formula (1), a substituted or unsubstituted alkyl group is preferably a straight chain, branched chain or alicyclic alkyl group having 1 to 12 carbon atoms. The alkyl group is preferably the one having a branched chain, and especially preferably the one having an asymmetric carbon atom (in the form of a racemic body) from the view point of improving the solubility of the dye and the stability of the water-based ink. The substituted or unsubstituted alkyl group includes a methyl group, an ethyl group, a n-butyl group, an isopropyl group, a tert-butyl group, a hydroxyethyl group, a methoxyethyl group, a cyanoethyl group, a trifluoromethyl group, a 3-sulfopropyl group, a 4-sulfobutyl group, and the like.

In the general formula (1), a substituent of the substituted alkyl group includes a straight chain or branched chain alkyl group having 1 to 12 carbon atoms, such as a methyl group, an ethyl group, a propyl group, an isopropyl group, a sec-butyl group, a tert-butyl group, a 2-ethylhexyl group, a 2-methylsulfonyl ethyl group, a 3-phenoxy propyl group, a trifluoromethyl group, a cyclopentyl group, or the like; a straight chain or branched chain aralkyl group having 7 to 18 carbon atoms; a straight chain or branched chain alkenyl group having 2 to 12 carbon atoms; a straight chain or branched chain alkynyl group having 2 to 12 carbon atoms; a straight chain or branched chain cycloalkyl group having 3 to 12 carbon atoms; a straight chain or branched chain cycloalkenyl group having 3 to 12 carbon atoms; a halogen atom such as a chlorine atom, a bromine atom, or the like; an aryl group such as a phenyl group, a 4-tert-butylphenyl group, a 2,4-di-tert-aminophenyl group, or the like; a heterocyclic group such as an imidazolyl group, a pyrazolyl group, a triazolyl group, a 2-furil group, a 2-thienyl group, a 2-pyrimidinyl group, a 2-benzothiazolyl group, or the like; a cyano group; a hydroxyl group; a nitro group; a carboxyl group; an amino group; an alkoxy group such as a methoxy group, an ethoxy group, a 2-methoxyethoxy group, a 2-methanesulfonylethoxy group, or the like; an aryloxy group such as a phenoxy group, a 2-methylphenoxy group, a 4-tert-butylphenoxy group, a 3-nitrophenoxy group, a 3-tert-butoxycarbamoylphenoxy group, a 3-methoxycarbamoyl group, or the like; an acylamino group such as an acetamide group, a benzamide group, a 4-(3-tert-butyl-4-hydroxyphenoxy)butanamide group, or the like; an alkylamino group such as a methylamino group, a butylamino group, a diethylamino group, a methylbutylamino group, or the like; an anilino group such as a phenylamino group, a 2-chloroanilino group, or the like; an ureide group such as a phenylureide group, a methylureide group, an N,N-dibutylureide group, or the like; a sulfamoylamino group such as an N,N-dipropylsulfarnoylamino group or the like; an alkylthio group such as a methylthio group, an octylthio group, a 2-phenoxyethylthio group, or the like; an arylthio group such as a phenylthio group, a 2-butoxy-5-tert-octylphenylthio group, a 2-carboxyphenylthio group, or the like; an alkoxycarbonylamino group such as a methoxycarbonylamino group or the like; a sulfonamide group such as a methanesulfonamide group, a benzenesulfonamide group, a p-toluenesulfonamide group, or the like; a carbamoyl group such as an N-ethylcarbamoyl group; a sulfamoyl group such as an N,N-dipropylsulfamoyl group, an N-phenylsulfamoyl group or the like; a sulfonyl group such as a methanesulfonyl group, an octanesulfonyl group, a benzenesulfonyl group, a toluenesulfonyl group, or the like; an alkoxycarbonyl group such as a methoxycarbonyl group, a butoxycarbonyl group, or the like; a heterocyclic oxy group such as a 1-phenyltetrazole-5-oxy group, a 2-tetrahydroxypyranyloxy group, or the like; an azo group such as a phenylazo group, a 4-methoxyphenylazo group, a 4-pivaloylaminophenylazo group, a 2-hydroxy-4-propanoylphenylazo group, or the like; an acyloxy group such as an acetoxy group or the like; a carbamoyloxy group such as an N-methylcarbamoyloxy group, an N-phenylcarbamoyloxy group, or the like; a silyloxy group such as a trimethylsilyloxy group, a dibutylmethylsilyloxy group, or the like; an aryloxycarbonylamino group such as a phenoxycarbonylamino group or the like; an imide group such as an N-succinimide group, an N-phthalimide group, or the like; a heterocyclic thio group such as a 2-benzothiazolylthio group, a 2,4-diphenoxy-1,3,5-triazole-6-thio group, a 2-pyridylthio group, or the like; a sulfinyl group such as a 3-phenoxypropylsulfinyl group or the like; a phosphonyl group such as a phenoxyphosphonyl group, an octyloxyphosphonyl group, a phenylphosphonyl group, or the like; an aryloxycarbonyl group such as a phenoxycarbonyl group or the like; an acyl group such as an acetyl group, a 3-phenylpropanoyl group, a benzoyl group, or the like; an ionic hydrophilic group such as a carboxyl group, a sulfo group, a phosphono group, a quaternary ammonium group, or the like; and the like. The alkyl group, the aralkyl group, the alkenyl group, the alkynyl group, the cycloalkyl group, and the cycloalkenyl group as the substituent of the substituted alkyl group are preferably those having a branched chain, especially preferably those having an asymmetric carbon atom, from the view point of improving the solubility of the dye and the stability of the water-based ink.

A preferred dye represented by the general formula (1) is, for example, a dye wherein, in the general formula (1), $R_1$, $R_2$,

$R_3$, and $R_4$ each represent —$SO_2R_a$; the respective $R_a$s in $R_1$, $R_2$, $R_3$, and $R_4$ are not all identical; and at least one of the $R_a$s is a substituted alkyl group having an ionic hydrophilic group.

A more preferred dye represented by the general formula (1) is, for example, a dye wherein, in the general formula (1), k satisfies 0<k<4, l satisfies 0<l<4, m satisfies 0≤n<4, n satisfies 0≤n<4, and k, l, m, and n satisfy k+l+m+n=4.

Preferred examples of the dye represented by the general formula (1) include compounds represented by chemical formulae (1-A) to (1-E).

(1-A)

The compound represented by the chemical formula (1-A) is a compound, wherein, in the general formula (1), $R_1$ is a lithium sulfonato propylsulfonyl group, $R_2$ is an N-(2-hydroxypropyl)sulfamoylpropylsulfonyl group, k is 3, l is 1, and m and n are both 0.

(1-B)

The compound represented by the chemical formula (1-B) is another compound, wherein, in the general formula (1), $R_1$ is a lithium sulfonato propylsulfonyl group, $R_2$ is an N-(2-hydroxyisopropyl)sulfamoylpropylsulfonyl group, k is 3, l is 1, and m and n are both 0.

(1-C)

The compound represented by the chemical formula (1-C) is still another compound, wherein, in the general formula (1), $R_1$ is a lithium sulfonato propylsulfonyl group, $R_2$ is an N,N-(di(2-hydroxyethyl)) sulfamoylpropylsulfonyl group, k is 3, l is 1, and m and n are both 0.

(1-D)

The compound represented by the chemical formula (1-D) is yet another compound, wherein, in the general formula (1), $R_1$ is a lithium sulfonato propylsulfonyl group, $R_2$ is an N-(2-hydroxypropyl)sulfamoylpropylsulfonyl group, $R_3$ is an N-(2-hydroxyisopropyl)sulfamoylpropylsulfonyl group, k is 2, l is 1, m is 1, and n is 0.

(1-E)

The compound represented by the chemical formula (1-E) is yet another compound, wherein, in the general formula (1), $R_1$ is a lithium sulfonato propylsulfonyl group, $R_2$ is a lithium carboxylate propylsulfonyl group, $R_3$ is an N-(2-hydroxypropyl) sulfamoylpropylsulfonyl group, $R_4$ is an N-(2-hydroxyisopropyl) sulfamoylpropylsulfonyl group, and k, l, in, and n are all 1.

The dyes (1-A) to (1-E) can be produced, for example, by a method disclosed in United States Patent Application Publication No. 2012/0081453. The contents of United States Patent Application Publication No. 2012/0081453 are incorporated by reference in its entirety as if made a part of this present description.

The blending amount of the dye represented by the general formula (1) with respect to the entire amount of the water-based ink is not especially limited. By containing the dye represented by the general formula (1) in the water-based ink, it is possible to obtain the water-based ink having superior ozone resistance. The blending amount of the dye represented by the general formula (1) is, for example, in the range of 0.1% by weight to 10% by weight, preferably in the range of 1.4% by weight to 5.7% by weight, and more preferably in the range of 1.6% by weight to 4.8% by weight with respect to the entire amount of the water-based ink.

In addition to the dye represented by the general formula (1), the water-based ink may further contain, for example, other dyes and pigments, as a colorant. Or, the water-based ink may not contain those other than the dye represented by the general formula (1) as the colorant.

The water is preferably ion-exchange water or purified water. The blending amount of the water with respect to the entire amount of the water-based ink (the proportion of the water in the water-based ink) is, for example, in the range of 10% by weight to 90% by weight, and preferably in the range of 40% by weight to 80% by weight. The proportion of the water in the water-based ink may be, for example, a balance of the other components.

The triazole-based compound is not particularly limited, and is exemplified by, for example, benzotriazole, carboxybenzotriazole, tolyltriazole, and nitrobenzotriazole. These triazole-based compounds may be used alone or in a combination of two or more of them. By containing the triazole-based compound(s) in the water-based ink, it is possible to obtain the water-based ink having excellent rust-preventing property.

The blending amount of the triazole-based compound with respect to the entire amount of the water-based ink is, for example, in the range of 0.01% by weight to 1% by weight, preferably in the range of 0.05% by weight to 0.5% by weight, and more preferably in the range of 0.05% Y by weight to 0.2% by weight.

The water-based ink may further contain a water-soluble organic solvent. The water-soluble organic solvent includes, for example, a humectant which prevents the water-based ink from drying at a nozzle tip portion of an ink-jet head and a penetrant which adjusts a drying rate of the water-based ink on a recording medium.

The humectant is not particularly limited, and includes lower alcohols such as methyl alcohol, ethyl alcohol, n-propyl alcohol, isopropyl alcohol, n-butyl alcohol, sec-butyl alcohol, tert-butyl alcohol, and the like; amides such as dimethylformamide, dimethylacetamide, and the like; ketones such as acetone and the like; ketoalcohols such as diacetone alcohol and the like; ethers such as tetrahydrofuran, dioxane, and the like; polyalcohols such as polyalkylene glycol, alkylene glycol, glycerin, trimethylolpropane, and the like; 2-pyrrolidone; N-methyl-2-pyrrolidone; 1,3-dimethyl-2-imidazolidinone; and the like. The polyalkylene glycol includes polyethylene glycol, polypropylene glycol, and the like. The alkylene glycol includes ethylene glycol, propylene glycol, butylene glycol, diethylene glycol, triethylene glycol, dipropylene glycol, tripropylene glycol, thiodiglycol, hexylene glycol, and the like. These humectants may be used alone or in a combination of two or more of them. Out of these, the humectant is preferably polyalcohol such as alkylene glycol, glycerin, or the like.

The blending amount of the humectant with respect to the entire amount of the water-based ink is, for example, in the range of 0% by weight to 95% by weight, preferably in the range of 5% by weight to 80% by weight, and more preferably in the range of 5% by weight to 50% by weight.

The penetrant includes glycol ether and the like. The glycol ether includes ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, tripropylene glycol-n-butyl ether, and the like. The penetrants may be used alone or in a combination of two or more of them.

The blending amount of the penetrant with respect to the entire amount of the water-based ink is, for example, in the range of 0% by weight to 20% by weight, preferably in the range of 0.1% by weight to 15% by weight, and more preferably in the range of 0.5% by weight to 10% by weight.

The water-based ink may further contain a conventionally known additive as required. The additive includes a surfactant, a pH adjuster, a viscosity modifier, a surface tension modifier, a mildew proofing agent, and the like. The viscosity modifier includes polyvinyl alcohol, cellulose, a water-soluble resin, and the like.

The water-based ink can be prepared, for example, by uniformly mixing the dye represented by the general formula (1), water, the triazole-based compound with other addition components as required by a conventionally known method, and then removing sediments with a filter etc.

The water-based ink can be used, for example, as a water-based cyan ink. The present teaching, however, is not limited thereto. By using a colorant containing another dye other than the dye represented by the general formula (1), the water-based ink may be a water-based ink having a color other than the cyan.

As described above, the ink cartridge of the present teaching is capable of suppressing the generation of the precipitation, even when the water-based ink for ink-jet recording containing the copper phthalocyanine-based dye with higher or enhanced ozone resistance represented by the general formula (1) and the triazole-based compound is accommodated in the ink cartridge, because the concentration of the iron-oxidized component at the surface (the contact surface), of the metallic component, which comes into contact with the water-based ink is not more than 5 atomic %.

[Method for Manufacturing Ink Cartridge]

The ink cartridge of the present teaching may be produced by a method for manufacturing an ink cartridge including: preparing a metallic component which has a contact surface, a concentration of a iron-oxidized component at the contact surface being not more than 5 atomic %; incorporating the metallic component into the ink cartridge; preparing a water-based ink containing a dye represented by a general formula (1), a triazole-based compound, and water; and accommodating the water-based ink into the ink cartridge so that the water-based ink contacts with the contact surface of the metallic component in the ink cartridge. In the method for manufacturing the ink cartridge of the present teaching, a method for adjusting the concentration of the iron-oxidized component may be performed in a similar manner to that of the ink cartridge of the present teaching. Further, in the method for manufacturing the ink cartridge of the present teaching, the condition such as the material of the metallic component and composition of the water-based ink may be selected in a similar manner to that of the ink cartridge of the present teaching.

[Method for Preventing Precipitation of Water-Based Ink for Ink-Jet Recording]

Next, an explanation will be made about a method for preventing precipitation of the water-based ink for ink-jet recording in the ink cartridge of the present teaching. As described above, the method for preventing the precipitation of the present teaching is a method for preventing the precipitation of the water-based ink for ink-jet recording in the ink cartridge, wherein the water-based ink contains the dye represented by the general formula (1), water, and the triazole-based compound; the ink cartridge includes the metallic component; the precipitation is prevented by making the concentration of the iron-oxidized component at the surface, of the metallic component, which comes into contact with the water-based ink, be not more than 5 atomic %, the concentration of the iron-oxidized component being measured by the X-ray photoelectron spectroscopy method (XPS).

In the method for preventing the precipitation of the present teaching, the method for adjusting the concentration of the iron-oxidized component may be performed in a similar manner to that of the ink cartridge of the present teaching. Further, in the method for preventing the precipitation of the present teaching, the condition such as the material of the metallic component and composition of the water-based ink may be selected in a similar manner to that of the ink cartridge of the present teaching.

[Ink-Jet Recording Apparatus]

Next, an explanation will be made about an ink-jet recording apparatus using the ink cartridge of the present teaching. The recording includes printing text (character, letter), printing image or picture, printing, etc.

Figure 3:
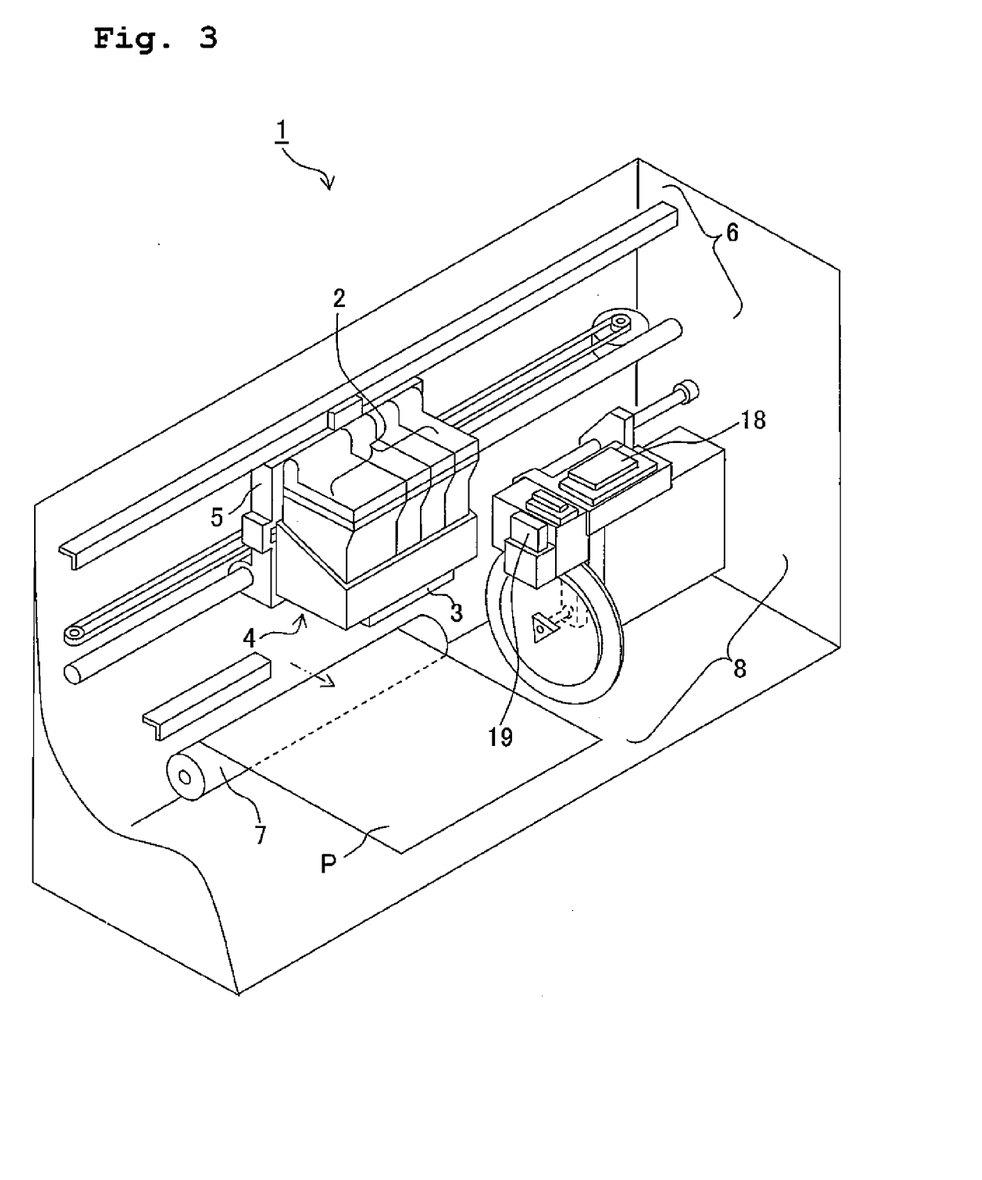
FIG. 3 is a schematic perspective view showing an example of a construction of the ink-jet recording apparatus.

FIG. 3 shows an example of the construction of the ink-jet recording apparatus using the ink cartridge of the present teaching. As shown in FIG. 3, an ink-jet recording apparatus 1 includes four ink cartridges 2, an ink discharging mechanism (ink-jet head) 3, a head unit 4, a carriage 5, a drive unit 6, a platen roller 7, and a purge unit 8 as main components.

The four ink cartridges 2 contain water-based inks of four colors, namely, yellow, magenta, cyan, and black, respectively. For example, the ink cartridge containing the water-based cyan ink is the ink cartridge of the present teaching. As for other ink cartridges, it is allowable to use ink cartridges in which commercially available water-based inks are accommodated. The ink-jet head 3 performs recording on a recording medium P such as a recording paper. The head unit 4 is provided with the ink-jet head 3. The four ink cartridges 2 and the head unit 4 are mounted on the carriage 5. The driving unit 6 reciprocates the carriage 5 in a linear direction. As the driving unit 6, it is possible to use, for example, a conventionally known driving unit (see, for example, Japanese Patent Application laid-open No. 2008-246821 corresponding to United States Patent Application Publication No. 2008/0241398). The platen roller 7 extends in the reciprocating direction of the carriage 5 and is arranged to face or be opposite to the ink-jet head 3.

The purge device 8 sucks unsatisfactory or degraded ink containing air bubbles etc., accumulated in the ink-jet head 3. As the purge device 8, it is possible to use, for example, a conventionally known purge device (for example, see Japanese Patent Application laid-open No. 2008-246821 corresponding to United States Patent Application Publication No. 2008/0241398).

A wiper member 19 is provided on the side of the platen roller 7 of the purge device 8 such that the wiper member 19 is adjacent to the purge device 8. The wiper member 19 is formed to have a spatula form, and wipes a nozzle-formation surface of the ink-jet head 3 accompanying with the movement of the carriage 5. In FIG. 3, a cap 18 is provided to cover a plurality of nozzles of the ink-jet head 3 which is returned to the reset position upon completion of the recording, so as to prevent the water-based ink from drying.

In the ink-jet recording apparatus 1 of the present teaching, the four ink cartridges 2 are provided, together with the head unit 4, on one carriage 5. However, the present teaching is not limited to this. In the ink-jet recording apparatus, each of the four ink cartridges 2 may be provided on a carriage which is different (separate) from the carriage on which the head unit 4 is provided. Alternatively, each of the four ink cartridges 2 may be arranged and fixed inside the ink-jet recording apparatus, rather than being provided on the carriage 5. In such aspects, for example, each of the four ink cartridges 2 and the head unit 4 which is provided on the carriage 5 are connected with a tube etc., and the water-based ink is supplied from each of the four ink cartridges 2 to the head unit 4 via each of the tubes.

In the apparatus shown in FIG. 1, an ink-jet head of serial type (serial type ink-jet head) is adopted. However, the present teaching is not limited to this. The ink-jet recording apparatus may be an apparatus adopting an ink-jet head of line type (line type ink-jet head).

[Ink-Jet Recording Method]

Ink-jet recording using the ink-jet recording apparatus 1 is performed, for example, in the following manner. Namely, at first, the recording paper sheet P is supplied or fed from a paper feeding cassette or sheet feeding cassette (not shown) arranged at a side of or at a position below the ink-jet recording apparatus 1. The recording paper sheet P is introduced or guided between the ink-jet head 3 and the platen roller 7. Then, a predetermined recording is performed on the fed or introduced recording paper sheet P with the water-based ink discharged or jetted from the ink-jet head 3. Since the generation of the precipitation in the water-based ink is suppressed by using the ink cartridge of the present teaching, the water-based ink of the present teaching can be discharged stably from the ink-jet head 3 without causing filter clogging. The recording paper sheet P for which the recording has been performed is discharged from the ink-jet recording apparatus 1. In FIG. 3, a paper feeding mechanism and a paper discharge mechanism for the recording paper sheet P are omitted.

EXAMPLES

Next, examples of the present teaching will be explained together with comparative examples. Note that the present teaching is not limited and is not restricted to the examples and the comparative examples which will be described below.

Examples 1-4 and Comparative Examples 1-6

The ink cartridges of Examples 1-4 and Comparative Examples 1-6 were obtained by accommodating the water-based inks prepared by a method described below in the ink cartridges including the metallic component formed of SUS304. In each of the ink cartridges of Examples 1-4 and Comparative Examples 1-6, the concentration of the iron-oxidized component at the contact surface, of the metallic component, which comes into contact with the water-based ink was adjusted to a numerical value indicated in TABLE 1 by performing the acid treatment in which the metallic component was immersed in nitric acid. Further, in each of the ink cartridges of Examples 1-4 and Comparative Examples 1-6, the area of the contact surface, of the metallic component, which comes into contact with the water-based ink, per gram of the water-based ink was 76 mm/1 g.

[Preparation of Water-Based Ink]

The water-based inks for ink-jet recording accommodated in the ink cartridges of Examples 1-4 and Comparative Examples 1-6 were obtained by mixing their ink components (TABLE 1) uniformly and then filtering the resultant mixtures respectively through a hydrophilic polytetrafluoroethylene (PTFE) type membrane filter (pore diameter: 0.20 μm) manufactured by Toyo Roshi Kaisha, Ltd. In TABLE 1, dyes (2-A) to (2-C), and a dye (3) are compounds represented by chemical formulae (2-A) to (2-C), and a chemical formula (3) respectively. In the chemical formulae (2-A) to (2-C) and the chemical formula (3), Pc(Cu) represents a copper phthalocyanine nucleus represented by a general formula (Pc); at least one of substituents is present on each of four benzene rings A, B, C, and D of the copper phthalocyanine nucleus represented by the general formula (Pc).

The dyes (2-A) to (2-C), and the dye (3) can be produced, for example, by the method disclosed in United States Patent Application Publication No. 2012/0081453. The contents of United States Patent Application Publication No. 2012/0081453 are incorporated by reference in its entirety as if made a part of this present description.

With respect to the ink cartridges of Examples and Comparative Examples, (a) precipitation evaluation, (b) ozone resistance evaluation, and (c) rust-preventing evaluation of the water-based ink were conducted by the following methods.

(a) Precipitation Evaluation

Each of the ink cartridges of Examples 1-4 and Comparative Examples 1-6 was produced such that 10 mL of prepared water-based ink was sealed in a degassed state in the ink cartridge including the metallic component formed of SUS304. Each of the ink cartridges of Examples 1-4 and Comparative Examples 1-6 prepared in such a manner was allowed to leave in a thermostatic chamber for 10 days at a temperature of 60° C. The water-based ink accommodated in each of the ink cartridges of Examples 1-4 and Comparative Examples 1-6 after being allowed to leave was filtered at 0.5 mL/minute condition by using an electrocasting (electroforming) filter (pore diameter: 13 μm, effective filtering area: 8 cm²) and the evaluation was performed according to the following evaluation criteria. When observing the electrocasting filter after the filtration by using a microscope, it was confirmed that an amount of the precipitation tended to be increased as an amount of the water-based ink which could be filtered was smaller.

<Criteria for Evaluation of Precipitation Evaluation>
G: Water-based inks of 5 ink cartridges in Examples and Comparative Examples could be filtered within an hour
NG: Water-based inks of 5 ink cartridges in Examples and Comparative Examples could not be filtered within an hour (b) Ozone Resistance Evaluation Each of the ink cartridges, of Examples 1-4 and Comparative Examples 1-6, in which a required or necessary amount of water-based ink is accommodated was attached to a digital multi-function center DCP-110C carried with an ink-jet printer, manufactured by Brother industries, Ltd. Then, a gradation sample of each of the water-based inks was printed on a glossy photo paper BP60GLA manufactured by Brother Industries, Ltd., and a patch having an initial OD (optical density) value of 1.0 was thereby obtained. The OD value was measured with a spectrophotometer, Spectrolino (light source: $D_{65}$; observer: 2°; and status A), manufactured by Gretag Macbeth.

Using an ozone weather meter, OMS-H, manufactured by SUGA TEST INSTRUMENTS CO., LTD, the patch was allowed to leave for 40 hours under the condition that the ozone concentration was 1 ppm, the temperature in the chamber was 24° C., and the relative humidity in the chamber was 60%. Then, the OD value decrease rate (%) was determined according to the following equation, and the ozone resistance was evaluated according to the following evaluation criteria. The OD value decrease rate was smaller, as the ozone resistance of the water-based ink accommodated in each of the ink cartridges of Examples and Comparative Examples was higher.

OD value decrease rate(%)=$\{(X-Y)/X\}\times 100$

X: 1.0 (initial OD value)
Y: OD value after being allowed to leave
<Criteria for Evaluation of Ozone Resistance Evaluation>
G: OD value decrease rate was less than 30%
NG: OD value decrease rate was 30% or more and less than 40%

(c) Rust-Preventing Evaluation of Water-Based Ink 10 mL of the water-based ink accommodated in each of the ink cartridges of Examples 1-4 and Comparative Examples 1-6 was poured into an airtight container. It was prepared a sample piece of 42 alloy (alloy of nickel content about 42% and iron content about 58%) which was used for the ink-jet head and was processed in a strip shape (length 50 mm, width 10 mm, thickness 2 mm). One sample piece was immersed in the water-based ink in the airtight container, and was allowed to leave in a thermostatic chamber for 2 weeks at a temperature of 60° C. Then, the sample piece after being allowed to leave was taken out of the water-based ink. The sample piece taken out of the water-based ink was observed visually and microscopically. The rust-preventing evaluation of the water-based ink was made based on the results of visual and microscopic observations, in accordance with the following evaluation criteria.

<Criteria for Evaluation of Rust-Preventing Evaluation of Water-Based Ink>
G: Coloring and corrosion of 42 alloy were not observed
NG: Coloring and corrosion of 42 alloy were observed The compositions of the water-based inks accommodated in the ink cartridges of Examples 1-4 and Comparative Examples 1-6, the concentrations of the iron-oxidized components, and the evaluation results are shown in TABLE 1. In TABLE 1, each concentration of the iron-oxidized component was measured by using the following measurement apparatus under the following condition.

<Measurement Apparatus>
Scanning-type X-ray photoelectron spectrometer (XPS/ESCA) PHI Quantera II produced by ULVAC-PHI, Incorporated.
<Measurement Condition>
X-ray: HP-100 μm 100 W 18 kV
Area: 1400×300 in
Sweeps: 10
Sensitivity: 0.1 atomic %
Lower limit of quantitation: 1.0 atomic %
Analytical depth: 5-10 nm

TABLE 1

|  |  | Examples | | | |
|---|---|---|---|---|---|
|  |  | 1 | 2 | 3 | 4 |
| Water-based ink composition (% by weight) | Dye (1-A) | 3.7 | — | — | — |
|  | Dye (1-B) | — | 3.3 | — | — |
|  | Dye (1-C) | — | — | 3.3 | — |
|  | Dye (1-D) | — | — | — | 3.3 |
|  | Dye (2-A) | — | 0.4 | — | — |
|  | Dye (2-B) | — | — | — | 0.4 |
|  | Dye (2-C) | — | — | — | — |
|  | Dye (3) | — | — | 0.4 | — |
|  | Benzotriazole | 0.1 | — | — | 0.1 |
|  | Carboxybenzotriazole | — | 0.1 | — | — |
|  | Tolyltriazole | — | — | 0.1 | — |
|  | Glycerol | 25.0 | 25.0 | 25.0 | 25.0 |
|  | Triethylene glycol butyl ether | 5.0 | 5.0 | 5.0 | 5.0 |
|  | SUNNOL (trade name) NL-1430 (*1) | 0.2 | 0.2 | 0.2 | 0.2 |
|  | Triethanolamine | 0.2 | 0.2 | 0.2 | 0.2 |
|  | Water | balance | balance | balance | balance |
| Concentration of the iron-oxidized component (atomic %) | | 3.9 | 4.4 | 4.0 | 2.2 |
| Precipitation evaluation | | G | G | G | G |
| Ozone resistance evaluation | | G | G | G | G |
| Rust-preventing evaluation of water-based ink | | G | G | G | G |

|  |  | Comparative Examples | | | |
|---|---|---|---|---|---|
|  |  | 1 | 2 | 3 | 4 |
| Water-based ink composition (% by weight) | Dye (1-A) | 3.7 | — | — | — |
|  | Dye (1-B) | — | 3.3 | — | — |
|  | Dye (1-C) | — | — | — | — |
|  | Dye (1-D) | — | — | — | — |
|  | Dye (2-A) | — | 0.4 | — | — |
|  | Dye (2-B) | — | — | 3.7 | — |
|  | Dye (2-C) | — | — | — | — |
|  | Dye (3) | — | — | — | 3.7 |
|  | Benzotriazole | 0.1 | — | 0.1 | — |
|  | Carboxybenzotriazole | — | 0.1 | — | — |
|  | Tolyltriazole | — | — | — | 0.1 |
|  | Glycerol | 25.0 | 25.0 | 25.0 | 25.0 |
|  | Triethylene glycol butyl ether | 5.0 | 5.0 | 5.0 | 5.0 |
|  | SUNNOL (trade name) NL-1430 (*1) | 0.2 | 0.2 | 0.2 | 0.2 |
|  | Triethanolamine | 0.2 | 0.2 | 0.2 | 0.2 |
|  | Water | balance | balance | balance | balance |
| Concentration of the iron-oxidized component (atomic %) | | 6.8 | 6.0 | 5.8 | 4.0 |
| Precipitation evaluation | | NG | NG | G | G |
| Ozone resistance evaluation | | G | G | NG | NG |
| Rust-preventing evaluation of water-based ink | | G | G | G | G |

|  |  | Comparative Examples | |
|---|---|---|---|
|  |  | 5 | 6 |
| Water-based ink composition (% by weight) | Dye (1-A) | — | — |
|  | Dye (1-B) | — | — |
|  | Dye (1-C) | 3.3 | — |
|  | Dye (1-D) | — | 3.3 |
|  | Dye (2-A) | — | — |
|  | Dye (2-B) | — | 0.4 |
|  | Dye (2-C) | 0.4 | — |
|  | Dye (3) | — | — |
|  | Benzotriazole | — | — |
|  | Carboxybenzotriazole | — | — |
|  | Tolyltriazole | — | — |
|  | Glycerol | 25.0 | 25.0 |
|  | Triethylene glycol butyl ether | 5.0 | 5.0 |
|  | SUNNOL (trade name) NL-1430 (*1) | 0.2 | 0.2 |
|  | Triethanolamine | 0.2 | 0.2 |
|  | Water | balance | balance |
| Concentration of the iron-oxidized component (atomic %) | | 6.3 | 4.2 |
| Precipitation evaluation | | G | G |
| Ozone resistance evaluation | | G | G |
| Rust-preventing evaluation of water-based ink | | NG | NG |

(*1): Sodium polyoxyethylene alkyl (C = 12, 13) ether sulfate (3E.O.); produced by Lion Corporation, active-ingredient amount = 28% by weight, the numerical value in each parenthes indicates the active-ingredient amount.

As shown in TABLE 1, the water-based inks of Examples 1 to 4 showed favorable results in all of the precipitation evaluation, the ozone resistance evaluation, and the rust-preventing evaluation of the water-based ink. On the other hand, the water-based inks, of Comparative Examples 1 and 2, in which the concentration of the iron-oxidized component at the contact surface, of the metallic component, which comes into contact with the water-based ink exceeds 5 atomic % showed unfavorable results in the precipitation evaluation. Each of the water-based inks accommodated in one of the ink cartridges in Comparative Examples 3 and 4 which contained the dye (2-B) or the dye (2-C) instead of the dye represented by the general formula (1) showed unfavorable result in the ozone resistance evaluation. The water-based inks accommodated in the ink cartridges, of Comparative Examples 5 and 6, which did not contain the triazole-based compound showed unfavorable results in the rust-preventing evaluation of the water-based ink.

As described above, the ink cartridge of the present teaching is capable of suppressing the generation of the precipitation even when the water-based ink for ink-jet recording containing the copper phthalocyanine-based dye with higher or enhanced ozone resistance and the triazole-based compound is accommodated therein. The usage of the ink cartridge of the present teaching is not specifically limited, and the ink cartridge of the present teaching is widely applicable to a variety of kinds of ink-jet recording.

What is claimed is:

1. An ink cartridge comprising:
    a water-based ink for ink-jet recording which contains a dye represented by a general formula (1), a triazole-based compound, and water; and
    a metallic component which has a contact surface contacting with the water-based ink, a concentration of an iron-oxidized component at the contact surface being greater than 0 atomic % and not more than 5 atomic %;

(1)

wherein, in the general formula (1),
    Pc (Cu) represents a copper phthalocyanine nucleus represented by a general formula (Pc);
    $R_1$, $R_2$, $R_3$, and $R_4$ each represent a substituent selected from the group consisting of —$SO_2R_a$, —$SO_2NR_bR_c$, and —$CO_2R_a$; $R_1$, $R_2$, $R_3$, and $R_4$ are not all identical to each other; at least one of $R_1$, $R_2$, $R_3$, and $R_4$ has an ionic hydrophilic group as a substituent; at least one of $R_1$, $R_2$, $R_3$, and $R_4$ is present on each of four benzene rings A, B, C, and D of the copper phthalocyanine nucleus represented by the general formula (Pc); $R_a$ represents a substituted or unsubstituted alkyl group; $R_b$ represents a hydrogen atom or a substituted or unsubstituted alkyl group; $R_c$ represents a substituted or unsubstituted alkyl group;

k satisfies 0<k<8; l satisfies 0<l<8; m satisfies 0≤m<8: n satisfies 0≤n<8; and k, l, m, and n satisfy 4≤k+l+m+n≤8.

2. The ink cartridge according to claim 1, wherein the concentration of the iron-oxidized component at the contact surface is made to be not more than 5 atomic % by performing at least one treatment selected from the group consisting of an acid treatment, an alkali treatment, and a chelate treatment to the metallic component.

3. The ink cartridge according to claim 1, wherein an area of the contact surface is not more than 150 mm² per gram of the water-based ink.

4. The ink cartridge according to claim 1, wherein the contact surface is covered with the material selected from the group consisting of resin, chromium plating, and nickel plating.

5. The ink cartridge according to claim 1, wherein the triazole-based compound is at least one compound selected from the group consisting of benzotriazole, carboxybenzotriazole, tolyltriazole, and nitrobenzotriazole.

6. The ink cartridge according to claim 1, wherein the metallic component is formed of stainless steel.

7. The ink cartridge according to claim 1, wherein the concentration of the iron-oxidized component at the contact surface is 1 atomic % to 2 atomic %.

8. A method for manufacturing an ink cartridge comprising:
preparing a metallic component which has a contact surface, a concentration of an iron-oxidized component at the contact surface being greater than 0 atomic % and not more than 5 atomic %;
incorporating the metallic component into the ink cartridge;
preparing a water-based ink containing a dye represented by a general formula (1), a triazole-based compound, and water; and
accommodating the water-based ink into the ink cartridge so that the water-based ink contacts with the contact surface of the metallic component in the ink cartridge wherein, in the general formula (1),
Pc (Cu) represents a copper phthalocyanine nucleus represented by a general formula (Pc);
$R_1$, $R_2$, $R_3$, and $R_4$ each represent a substituent selected from the group consisting of —$SO_2R_a$, —$SO_2NR_bR_c$, and —$CO_2R_a$; $R_1$, $R_2$, $R_3$, and $R_4$ are not all identical to each other; at least one of $R_1$, $R_2$, $R_3$, and $R_4$ has an ionic hydrophilic group as a substituent; at least one of $R_1$, $R_2$, $R_3$, and $R_4$ is present on each of four benzene rings A, B, C, and D of the copper phthalocyanine nucleus represented by the general formula (Pc); $R_a$ represents a substituted or unsubstituted alkyl group; $R_b$ represents a hydrogen atom or a substituted or unsubstituted alkyl group; $R_c$ represents a substituted or unsubstituted alkyl group;

k satisfies 0<k<8; l satisfies 0<l<8; m satisfies 0≤m<8: n satisfies 0<η<8; and k, l, m, and n satisfy 4≤k+l+m+n≤8.

9. The method for manufacturing the ink cartridge according to claim 8, wherein the preparing of the metallic component includes performing at least one treatment selected from the group consisting of an acid treatment, an alkali treatment, and a chelate treatment to the metallic component to make the concentration of the iron-oxidized component at the contact surface be not more than 5 atomic %.

10. The method for manufacturing the ink cartridge according to claim 8, wherein the concentration of the iron-oxidized component at the contact surface is 1 atomic % to 2 atomic %.

11. An ink-jet recording apparatus which performs recording on a recording medium, the apparatus comprising:
an ink cartridge accommodating section which accommodates the ink cartridge as defined in claim 1; and
an ink discharging mechanism which discharges, onto the recording medium, the water-based ink of the ink cartridge.

12. An ink-jet recording method for performing recording on a recording medium, the method comprising:
preparing the ink cartridge as defined in claim 1; and
discharging, onto the recording medium, the water-based ink of the ink cartridge.

* * * * *